(No Model.)
J. H. & H. E. WILLIAMS.
COTTON CULTIVATOR.
No. 475,101. Patented May 17, 1892.
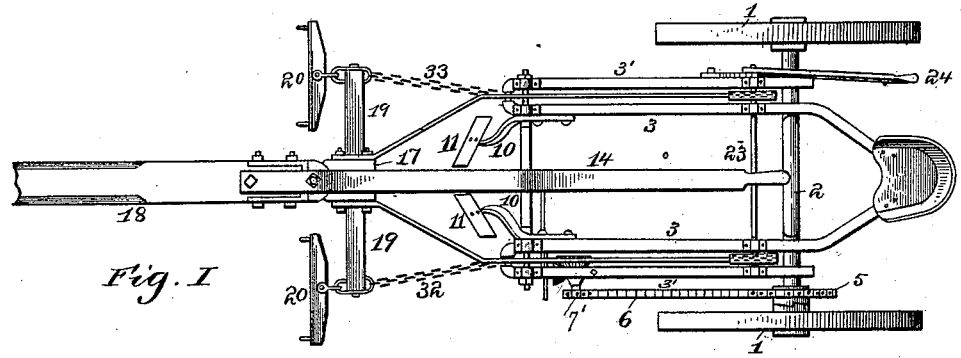
Fig. I.
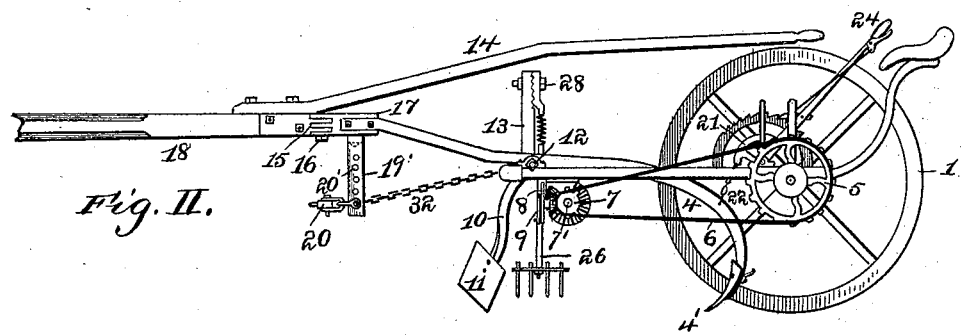
Fig. II.
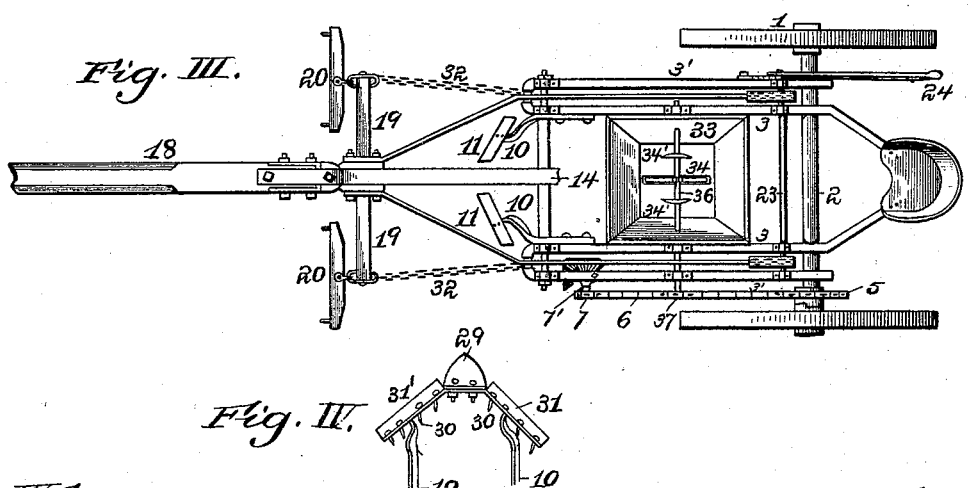
Fig. III.
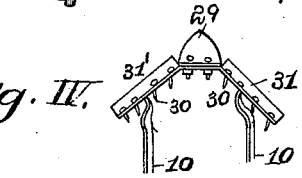
Fig. IV.
Witnesses:
J. B. McGirr.
William O. Belt.
Inventors.
James H. Williams and
Horace E. Williams
By their Attorneys,
Edson Bros.
THE NORRIS PETERS CO., PHOTO-LITHO., WASHINGTON, D. C.

UNITED STATES PATENT OFFICE.

JAMES H. WILLIAMS AND HORACE E. WILLIAMS, OF FAYETTEVILLE, ARKANSAS.

COTTON-CULTIVATOR.

SPECIFICATION forming part of Letters Patent No. 475,101, dated May 17, 1892.

Application filed July 13, 1891. Serial No. 399,355. (No model.)

*To all whom it may concern:*

Be it known that we, JAMES H. WILLIAMS and HORACE E. WILLIAMS, citizens of the United States, residing in Fayetteville, in the county of Washington and State of Arkansas, have invented certain new and useful Improvements in Cotton-Cultivators; and we do hereby declare the following to be a full, clear, and exact description of the invention, such as will enable others skilled in the art to which it appertains to make and use the same.

Our invention relates to certain improvements especially designed for use in the combined cotton chopper and scraper patented to J. H. Williams on September 9, 1890, No. 436,201.

The objects of our invention are, first, to construct the tongue of the machine in such manner that the driver is enabled to guide the scrapers and chopper in the various slight deviations of the row of plants; second, to provide a suitable rake to be used in lieu of the chopper-hoe; third, to improve the arrangement of the doubletree, and, fourth, to provide a planting mechanism to be attached to the machine in any convenient manner.

With these ends in view our invention consists of an improved tongue constructed in two sections, which are suitably hinged together, and a lever extending within convenient reach from the driver's seat and secured to the front section to guide the machine as desired. A hopper is secured on the main frame of the machine, and a shaft carrying an agitator is journaled in the frame and connected to the main driving-wheels by intermediate mechanism which operates the agitator. When the machine is used as a planter, the chopping-hoe is removed and an opener or plowshare, carrying diverging harrows extending rearwardly, is secured in place instead of the scrapers. On the rear section of the tongue is secured a horizontal bar with downwardly-extending ends, which are provided with a series of holes, and the singletrees are attached to these perforated ends of the bar, and they are steadied by chains connected to the main frame.

Our invention further consists of certain details of construction and arrangement of parts, which will more fully appear hereinafter.

In the accompanying drawings, Fig. I is a plan view of our machine without the planting mechanism. Fig. II is a side elevation with one of the carrying-wheels removed. Fig. III is a plan view with the planting mechanism in place, and Fig. IV is a detail view of the opener and harrows.

Referring to the drawings, in which like numerals of reference denote corresponding parts in all the figures, 1 designates the carrying-wheels, which revolve loosely on axle 2, which is curved upward at the middle, so that the machine may work in tall plants, and on which the seat is supported. The main frame 3 of the machine is preferably made of tubular pieces, and is constructed with the two parallel adjacent pieces 3' on either side of the machine.

A driving sprocket-wheel 5 is loosely mounted on an axle on the inner side of one of the main wheels 1, with the notches in hub of each, so that they interlock and the main wheel gives motion to both. A chain 6 connects the same with another sprocket-wheel 7 to communicate the motion of sprocket-wheel 3 to the wheel 7. This wheel 7 is on shaft 7', which gives power to the gearing that moves a crank-disk 8, and a pitman 9 is connected with this disk and the arm 26 of the chopper or rake. This chopper-arm is adjustably secured to an upright support 13, fastened to the main frame 3 by a bolt 28, and it is constructed substantially as shown in the patent above referred to. In the front of the main frame are two depending arms 10, to which the scrapers 11 are secured in a suitable manner. The supplemental frame 4 is secured at its front end to rear of the tongue, and it is pivotally supported in the main frame by a shaft 12, journaled in bearings in the front of said main frame. This supplemental frame consists of two arms, which are pivoted between the parallel adjacent pieces of each side of the main frame, and the ends thereof depend to receive the plowshares 4', which are secured thereto. These depending ends are supported by chains 22, which pass over the disks 21, secured on the shaft 23, and by means of a lever 24, which is provided with an ordinary spring-pawl adapted to engage a fixed segment, the plows 4' may be raised out of the ground.

The tongue is constructed in two sections 17 18, the rear shorter section 17 being made of cast-iron or other suitable material. These two sections are hinged together by a bolt 16, which passes through interlocking projections 15 on each section, and a lever 14 is secured rigidly to the front section, and it extends back to the driver's seat. This is a desirable improvement, as the machine can be guided easily in the various irregularities and turns of the row by simply operating the lever 14. On the rear end of the section 17 is secured a transverse bar 19, which serves as a doubletree, and it is provided with the downwardly-extending end pieces 19', which have a series of holes 20'. The singletrees 20 can be adjustably secured to these ends 19' by any well-known means, and the ends are steadied by the equalizing-chains 32, secured to the main frame.

When it is desired to use the machine as a planter, the hopper 33 is secured on the main frame in a suitable manner between the inner pieces of the parallel adjacent side pieces. A shaft 36 is journaled in bearings in the main frame and carries an agitator 34, which works in the center of the hopper and extends a short distance through a slot in the bottom thereof. This hopper is preferably provided with a metallic bottom, and two supplementary agitators 34' are secured on the shaft 36 on either side of the agitator 34; but these supplementary agitators do not extend through the bottom of the hopper; but they tend to keep the grain in the hopper agitated and feed it into the slot in position for the agitator 34 to discharge the same. The shaft 36 is provided with a sprocket-wheel 37, which is connected by a chain 6' to the main sprocket-wheel 5, by means of which the agitators are operated.

When the machine is engaged in planting, the scrapers and chopper mechanism are preferably removed for convenience, and in lieu thereof a plowshare or opener 29 is secured in front of the depending feet 10 between the same, and the diverging harrows 31', having teeth 30, extend in rear of the opener. The opener and teeth of the harrow are secured on an angular iron 31, which is secured to the depending feet 10.

The operation of our invention is obvious from the foregoing description, and but one person is necessary to manage the entire machine.

We are aware that changes in the form and proportion of parts and details of construction can be made without departing from the spirit or sacrificing the advantages of these improvements, and we therefore reserve the right to make such changes as fairly fall within the scope of our invention.

Having thus fully described our invention, what we claim as new, and desire to secure by Letters Patent, is—

1. In a combined cotton chopper and scraper, the combination of the main frame, the carrying-wheels, the tongue composed of two sections suitably hinged together, the supplemental frame pivotally supported in the main frame and secured at its forward end to the rear section of the tongue, a lever secured to said rear section, the depending feet on the supplemental frame, the plows, the scrapers arranged on the front portion of the main frame, and the chopping mechanism intermediate of the plows and scrapers, substantially as described.

2. In a combined cotton chopper and scraper, a tongue composed of two sections 17 and 18, having the interlocking projections 15, a bolt passing through said projections to pivotally connect the sections together, the rear section being made of cast-iron or other suitable material, and the lever rigidly secured to the front section, substantially as described.

3. In a combined cotton chopper and scraper, a tongue composed of two sections suitably hinged together, a lever secured to the front section, a transverse piece 19, secured to the rear section and having the depending end pieces 19', and the singletrees, substantially as described.

4. In a cotton-cultivator, the main frame having the parallel adjacent side pieces on either side of the frame and consisting of tubular pieces all connected together, the depending arms 10, and an angular iron 31, secured on said feet and carrying the plow and harrows, substantially as described.

In testimony whereof we affix our signatures in presence of two witnesses.

JAMES H. WILLIAMS.
HORACE E. WILLIAMS.

Witnesses:
ALEX. PARKER,
L. W. GREGG.